Aug. 30, 1938.                    R. A. WINBORNE                    2,128,869
                            TEMPERATURE CONTROL DEVICE
                            Filed May 20, 1936              2 Sheets-Sheet 1
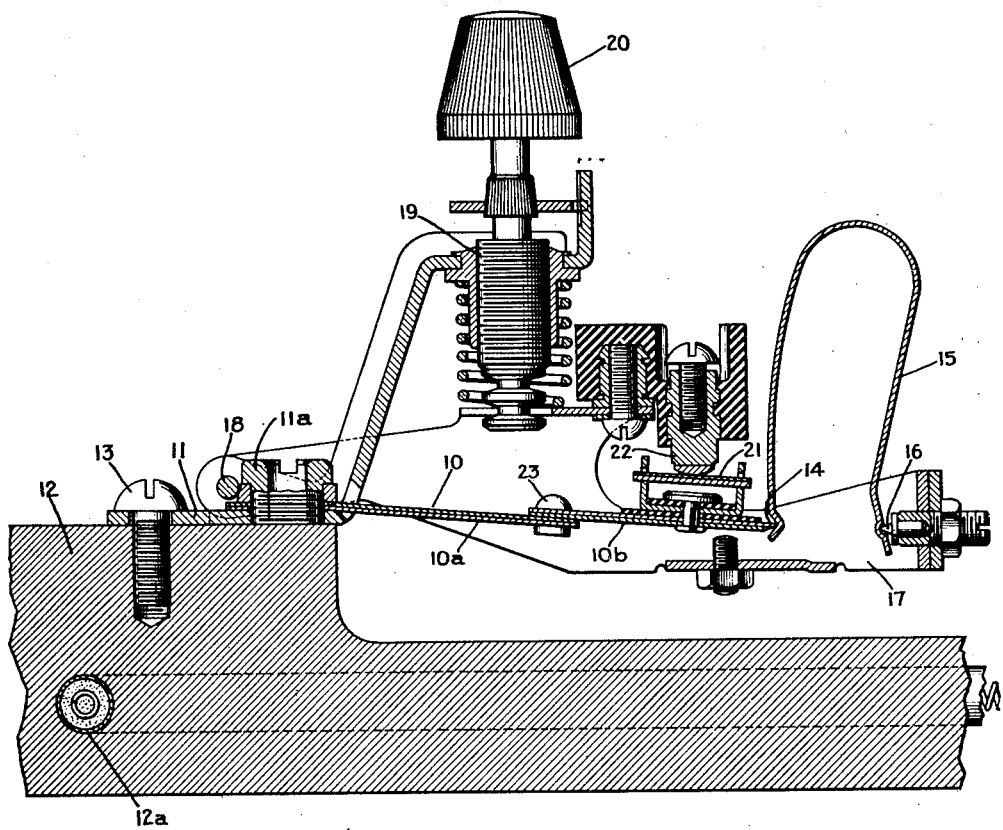
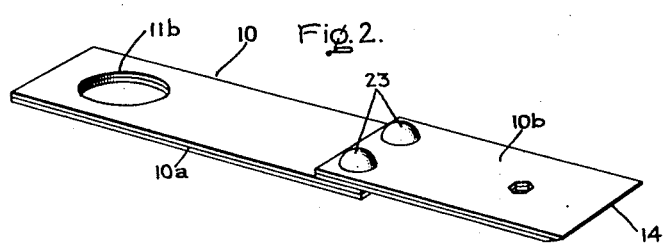
Inventor:
Russell A. Winborne,
by Harry E. Dunham
     His Attorney.

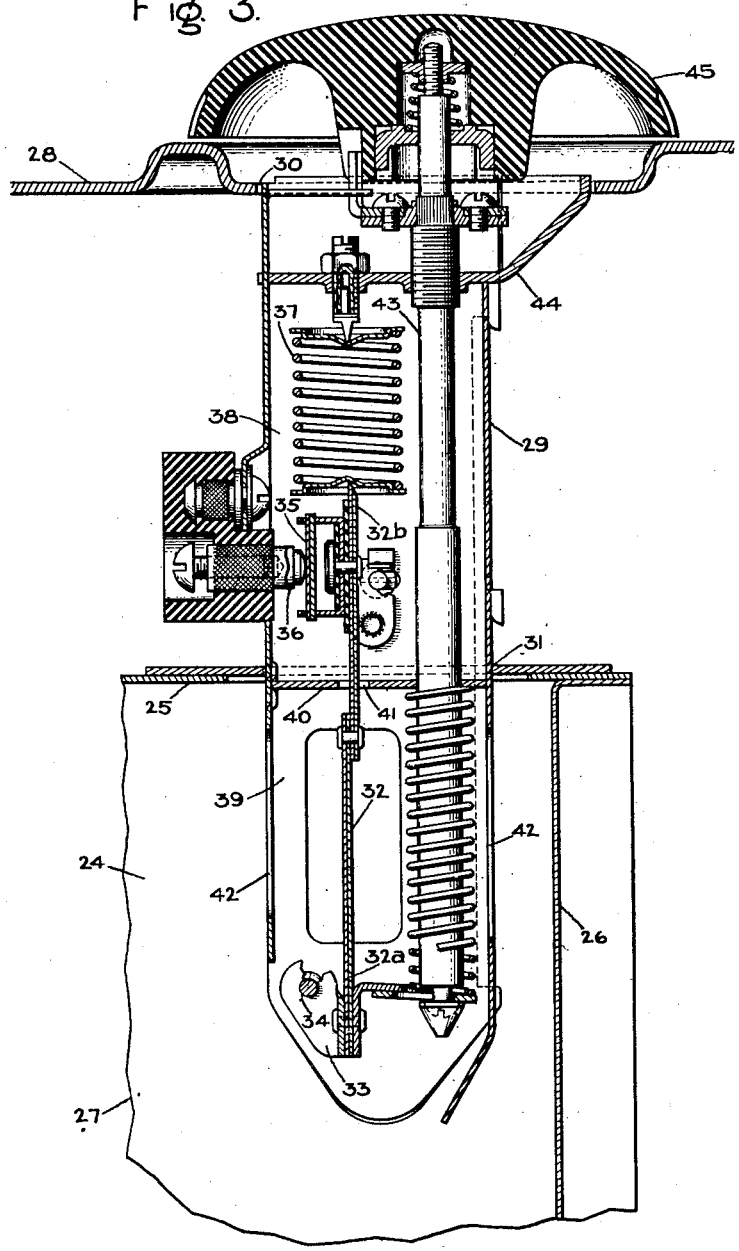

Patented Aug. 30, 1938

2,128,869

UNITED STATES PATENT OFFICE 2,128,869

TEMPERATURE CONTROL DEVICE

Russell A. Winborne, Oak Park, Ill., assignor to Edison General Electric Appliance Company, Inc., a corporation of New York Application May 20, 1936, Serial No. 80,770

4 Claims. (Cl. 200—138)

This invention relates to temperature control devices and it has for its object the provision of an improved device of this character.

This invention is particularly applicable to temperature control devices for controlling an electric circuit in accordance with temperature changes, such as the heating circuit of an electrically heated flatiron. It is to be understood, however, that this invention has more general application and is not limited in its application to electrically heated devices of this type having a heated solid medium. Thus, it is also adapted to thermostats controlling heated gaseous mediums such as the atmosphere in an electrically heated oven.

In electrically heated devices, it is customary to arrange the controlling thermostat in direct thermal relation with the medium whose temperature is being controlled. For example, in a flatiron a portion of the thermostat is clamped to the sole plate. Another portion is free to move as the temperature of the plate varies to operate a controlling switch for the iron.

It has been found in devices of this character where a portion only of the thermostat is in thermal relation with the heated medium that when the device is being initially heated from room temperature there is a tendency for the temperature of the heated body or medium to rise more rapidly than does the temperature of the thermostat. Due to this rapid rise in temperature during the first heating cycle, there occurs a temperature overshoot; that is, the temperature at which the thermostat operates to shut off the heat in the first cycle is higher than the cut off temperatures of the succeeding cycles.

In certain electrically heated devices, such as the flatiron, there has been a trend to higher and higher wattage heating elements; and in these devices the temperature overshoot in the first heating cycle has become quite objectionable. Often-times it is so great that the iron will scorch the fabrics, if it be used when in the overheated condition.

It is an object of this invention to eliminate this temperature overshoot and thereby to increase the sensitivity of control of the thermostat.

In accordance with this invention in one form thereof, the thermostat is given a compound structure, that is, a portion of the thermostat is so arranged that it moves in directions opposite to that of the main portion of the thermostat in response to changes in temperature. The two portions of the compound thermostat are proportioned so that the thermostat functions to cut off the heat in the first heat cycle at substantially the same maximum temperature that it would have had it not been given the compound structure. However, on cooling in the first cycle, the thermostat prematurely reapplies the heat for the second cycle. Also in the second heating cycle it delays the cutting off of the heat. The action of the thermostat in thus advancing the application of heat in the second cycle and in delaying the cut off of heat in this cycle elevates the cut off temperature in the second cycle substantially to that of the first cycle. It functions in a similar manner in succeeding cycles. In other words, the compound thermostat of this invention elevates the maximum temperatures of the second and succeeding heat cycles to that of the first; that is, it eliminates overshoot and evens out the temperature control.

For a more complete understanding of this invention, reference should be had to the accompanying drawings, in which Fig. 1 is a vertical elevation, mainly in section, of a temperature control device embodying this invention; Fig. 2 is a perspective view of a temperature control element used in the control device of Fig. 1; and Fig. 3 is a sectional view illustrating a temperature control element of modified form.

Referring to Figs. 1 and 2, this invention has been shown in one form as applied to a snap-action temperature responsive device intended to be used to control the energizing circuit of an electrically heated device, such as a flatiron. More specifically, this invention has been shown as applied to the type of temperature control device described and claimed in the copending application of W. J. Ettinger and N. Miller, Serial No. 759,932, filed December 31, 1934, and assigned to the same assignee as this invention.

Briefly, this temperature control device comprises a suitable thermostat shown as a bimetallic bar 10. This bar 10 is rigidly secured at one end to a metallic supporting base or frame 11 in any suitable manner, as by screw fastening means 11a. The bar 10, as shown, is provided with an aperture 11b through which the screw 11a is directed. The metallic support 11 with the bar 10 rigidly secured to it, in turn is rigidly secured to the body 12, whose temperature is to be controlled, by means of a clamping screw 13. In this case, the body 12 is the sole plate of an electrically heated flatiron. The thermostat is thus connected in direct thermal relation with the body 12 so that heat is imparted directly to the bar 10 from the body 12 by conduction when the body is heated. The body 12 is heated by an electric heating unit 12a. This unit may be of any suitable type, but preferably will be of the sheathed wire type, such as described and claimed in U. S. patent to C. C. Abbott No. 1,367,341, dated February 1, 1921.

The bimetallic bar 10 carries on its free or movable end a knife-edge bearing 14. Bearing on this movable end of the bar is a U-shaped compression spring 15, one arm of which, as shown, rests upon the knife-edge bearing 14 and its other arm upon a bearing 16. The bearing 16 is carried by a yoke 17 which is pivotally mounted to the frame 11 by means of a shaft 18.

The pivoted yoke 17 is secured to an adjusting screw 19 which is mounted in threaded engagement with the support 11, as clearly shown in Fig. 1. The adjusting screw is provided with a knob 20 whereby the position of the screw and hence of the yoke 17 can be adjusted. It will be understood, that when the position of the yoke is varied the position of the spring 15 likewise is varied. This changes the temperature setting of the control device, as pointed out more fully in the above-mentioned Ettinger and Miller application.

The free end of the bimetallic bar 10 operates the control device for the heating circuit of the flatiron. This control device comprises a movable or bridging contact 21, which cooperates with a pair of relatively fixed contacts 22. Only one of the fixed contacts 22 is illustrated, but it will be understood that there are two such contacts spaced apart from each other transversely of the control device. These fixed contacts are electrically connected in the heating circuit of the iron so that when the bridging contact 21 is in its position shown in Fig. 1, that is, when it is in its position to bridge both fixed contacts, the heating circuit for the iron will be completed, whereas when the thermostatic blade moves the bridging contact 21 away from the contacts 22, the heating circuit of the iron will be opened. It is not deemed necessary to show the complete energizing circuit for the heating element 12a, because this may have any suitable well-known arrangement. As far as this invention is concerned it is merely necessary to state that the two fixed contacts 22 are connected in this energizing circuit so that when they are closed by the bridging contact 21, the heating unit 12a is energized, and when they are opened by the removal of the bridging contact, the unit 12a is deenergized.

In the temperature control device such as described in the above Ettinger and Miller application, the bimetallic bar is so arranged that it has a uniform structure from one end to the other. In other words, it is formed of two strips of metal having dissimilar temperature coefficients of expansion, the two strips being welded together lengthwise from end to end so that the strips of different coefficients extend lengthwise throughout the full length of the blade on opposite sides of the meeting plane of the two strips. The strips are so arranged that the bar curves downwardly to open the heating circuit when heated to a predetermined high temperature, and upwardly to reapply the heat when it cools to a predetermined minimum temperature.

In temperature control devices of this character, as pointed out previously, there is an objectionable temperature overshoot on the first heating cycle. This is due to the fact that the thermostatic blade is in thermal contact with the heated body which it controls at only one point, namely at its fixed end where it is rigidly secured to the body. In view of the fact that the thermostatic bar receives substantially all of its heat by conduction from the body 12, the heat necessarily flows from the fixed end of the bar through the bar to its free movable end. The blade, of course, has thermal resistance to the flow of heat from the fixed to the movable end and in view of this there is an appreciable initial temperature gradient along the length of the thermostat from the fixed end to the free end, the higher temperature of the gradient, of course, being at the fixed end. Therefore, if the iron while at room temperature be plugged into an electrical supply source and heat be applied to the sole plate 12 from the heating unit 12a, the temperature in the sole plate will rise rapidly, the temperature of the thermostatic bar lagging behind it and following the temperature rise in the sole plate at a rate which depends upon the magnitude of the initial temperature gradient. This gradient in turn depends upon the thermal resistance of the blade 10, the rate at which heat is introduced into the sole plate 12 and the rate at which the heat from the sole plate 12 is imparted to the fixed end of the blade.

Because of this time lag in temperature rise in the blade during its first heat cycle, the first operation of the blade to open the switch results from deflection downwardly of that portion of the blade closest to the fixed end, the effect of the free end portion of the blade being substantially negligible due to the fact that it still is relatively cool. The temperature of the sole plate at which the thermostat opens the switch to shut off the heat, therefore is higher than it would be if the entire length of the blade were heated and hence utilized to open the switch.

The blade, however, during the heating portion of the first cycle and also during the cooling portion of this cycle is being heated by the flow of heat from the sole plate and through the bar to its remote free end. Eventually, the bar attains a saturated temperature condition, that is, a temperature condition wherein a final temperature gradient is established from the fixed to the free end. This gradient is materially less than the initial gradient and remains substantially unchanged during the following heat cycles. The magnitudes of temperatures from one end to the other of the bar change of course with changes in the sole plate temperature, but after saturation the gradient generally will attain this saturated temperature condition during the first heating and cooling cycle. As a result of this, the thermostatic bar during the cooling portion of the first cycle instead of moving upwardly toward the contacts 21 to close the switch to reapply heat, actually moves farther and farther away from the contacts 21 as it saturates. However, eventually due to the cooling of the sole plate and when the bar has attained its saturated temperature condition, the bar will reverse and move upwardly to close the switch. The movement away due to saturation, however, delays the closing of the switch and this permits the temperature at which the bar operates to reapply the heat to fall to a lower minimum in the first cycle than it should.

Due to this delay in closing the switch and because the thermostat will have attained its saturated temperature condition by the time the switch is closed, the thermostat will act to cut off the heat in the second cycle at a materially lower temperature than the maximum cut off temperature of the first cycle. That is, there has been a delay in applying heat for the second cycle. In addition to this, in the second cycle, in contradistinction to the first, the whole bar throughout its length curves in response to temperature rise in the sole plate in a direction to cut off the heat, and thereby effects a premature cut off. These two factors contribute to reduce the cut off temperature in the second cycle. The remaining heat cycles follow the second so that the first cycle relatively to the following cycles heats the iron to too high a temperature for the setting of the thermostat.

As pointed out previously, it is an object of this invention to obviate this temperature overshoot. This is accomplished by forming the thermostatic blade 10 into two sections 10a and 10b. The main section 10a is that which includes the fixed end of the blade which is secured to the plate 12, and it comprises the major portion of the length of the blade. The minor portion 10b constitutes the free end of the blade which actuates the switch. The portion 10b is rigidly secured to the portion 10a in any suitable manner as by means of rivets 23 so that the adjacent ends of the two portions are in direct physical contact with each other, as clearly shown in Figs. 1 and 2.

The portion 10b of the blade is reversely arranged with reference to the portion 10a. In other words, the portion 10b is so arranged that it curves in opposite directions to the movement of the main portion 10a in response to temperature changes. That is, when the portion 10a moves downwardly in response to a high temperature to cut off the heat, the portion 10b moves upwardly. Conversely, when the portion 10a moves upwardly in a direction to apply the heat, the portion 10b curves downwardly in a direction to cut off the heat.

The compound blade functions as follows:

During the first heating-up cycle, the blade acts substantially the same as it would if the portions 10a and 10b were uniform throughout their length, as shown in the Ettinger and Miller application, rather than being of the compound form of this invention. In other words, the opening movement of the compound blade on the first heating cycle is due to the downward curvature of that portion of the part 10a immediately next to the end of the blade clamped to the sole plate 12, the effect of the remaining length of the blade being negligible in this opening movement. During the first heating and cooling cycle, however, the blade attains a saturated temperature condition.

As the blade saturates, the portion 10b instead of curving farther and farther away from the fixed contact 22, as in the previous case where the blade has a uniform character from end to end, actually curves upwardly in the opposite direction toward the switch contacts 22. Thus, when the major portion 10a of the blade begins to reverse its curvature to move upwardly due to the continued cooling action of the sole plate, the portion 10b will operate to advance the closure of the contacts 22, that is, it will prematurely apply the heat when compared with the action of the uniform blade. In other words, the thermostat will function to reapply the heat at a higher minimum temperature in the first cycle than would be the case if the thermostat 10 were of the old uniform construction. It is to be understood that while the main portion is cooling to move upwardly, the portion 10b nevertheless will not curve downwardly during this first cycle, because it is attaining its saturated temperature condition from the relatively higher temperature part 10a. That is, even though the temperature of the bar adjacent its fixed end is cooling, that of the free end 10b is being elevated so that both portions act to close the switch prematurely on the second cycle. Moreover, after the blade has saturated, the portion 10b acting reversely to the portion 10a will delay somewhat the opening of the switch in the second cycle. The premature closing of the switch and the delay in opening it combine to elevate the maximum cut off temperature of the second cycle as well as the minimum temperature of the first cycle at which heat was reapplied. As a result of this, the sole plate 12 attains substantially the same maximum temperature in the second heating cycle before the heat is cut off as it does in the first heating cycle. Likewise, the remaining heating cycles will have substantially the same maximum temperature as the first and second heating cycles.

In other words, the temperature range between the minimum and maximum temperatures at which heat is reapplied and cut off in the second and succeeding heating cycles is elevated so that the maximum temperatures of each cycle are substantially the same as is the maximum temperature of the first heating cycle. Thus, the temperature overshoot of the first cycle relative to the remainder is eliminated.

It will be understood that the length of the portion 10b will be so related to the length of the portion 10a that it will compensate for the thermal lag in the blade 10. That is, it will compensate for the varying temperature condition and resultant varying curvature of the thermostat while it is attaining its saturated temperature condition. The compensation will be such that the switch will be prematurely closed and delayed in opening for the cycles following the first to such an extent that the temperature cut off of the second and following cycles will equal substantially the maximum of the first heating cycle.

It is to be understood that the blade portions 10a and 10b need not be united by rivets, as shown in Figs. 1 and 2, but may be welded together.

Moreover, considerable improvement may be attained over the conventional uniform blade simple by replacing the end portion 10b with a plain strip of metal of equivalent thickness, strength and length. While considerable improvement is obtained by such an arrangement, it does not give the sensitive action that the portion 10b provides.

As pointed out previously, this invention is not limited in its application to electrically heated flatirons. It is applicable generally to those devices wherein the thermostat attains a saturated temperature condition by the local application of heat to a part of the thermostat from the heated medium whose temperature is being controlled, and the heat flowing by conduction through the thermostat from the zone of heat application.

In Fig. 3 there is illustrated a form of this invention intended to control the gaseous atmosphere of an electric oven. As shown, the oven 24 is provided with inner walls defining an oven space comprising a top wall 25, side walls 26 (only one shown), a rear wall 27 and bottom and front walls (not shown). These walls are arranged in spaced relation with a plurality of corresponding outer walls defining an outer casing; only the top wall 28 of the outer casing is shown. Suitable thermal insulating material (not shown) is placed between the oven 24 and the outer casing.

The temperature control device in this form of the invention includes a cartridge-like casing 29 inserted through an aperture 30 provided for it in the outer wall 28 and an aperture 31 provided for it in the top wall 25 of the oven so that the lower end of the cartridge projects into the oven.

Arranged lengthwise within the casing 29 is a suitable bimetallic thermostatic member 32. This member, as shown, is rigidly secured at its lower end 32a to a support 33 which in turn is pivotally mounted on a shaft 34. The opposite end 32b of the thermostat is free to move in response to changes in temperature. This end carries a bridging contact 35 which cooperates with spaced fixed contacts 36 to control the heating circuit of the oven. A snap-action compression spring 37 bears on the free end of the bar.

As shown, the cartridge or casing 29 is divided into two chambers 38 and 39 by means of a division wall 40 which is located substantially at the level of the upper wall 25 of the oven. This wall is provided with an elongated aperture 41 through which the thermostat bar 32 is directed and which is sufficiently large to permit the bar to move between its switch controlling positions.

The lower end of the casing is provided with a plurality of relatively large openings 42 in its side walls and the bottom is open so that the oven gases can freely circulate around and about the portion 32a of the thermostatic member.

It will be observed that heat is directly applied to that portion 32a of the thermostatic member which lies below the wall 40 by the oven gases, and that the heat applied to this member heats the portion of the thermostatic blade above this wall to a saturated temperature condition by conduction through the blade.

In order to compensate for the change in position of the thermostatic member while it is saturating, the upper portion 32b of the blade is reversed with reference to the lower portion 32a, as is the portion 10b related to the portion 10a of thermostat 10 of the first form of this invention described.

The thermostat of Fig. 3 operates in the same way as does the thermostat described in the first form, the portion 32b having a length relative to the length of the portion 32a so that it will elevate the maximum cut-off temperature of the second and succeeding heat cycles substantially to the cut-off temperature of the first cycle.

In this form of the invention, temperature adjustment is effected by moving the support 33 on the shaft 34. This is accomplished by an adjusting rod 43 threaded into a support 44 provided for it and having its lower end connected to the support 33, as shown. An adjusting knob 45 is provided for the screw 43.

The specific pivotal mounting for the bimetallic temperature control blade 32, its adjusting means and the arrangement of the casing or cartridge 29 form no part of this invention, but constitute the subject matter of a co-pending application of W. J. Ettinger, Serial No. 98,186, filed August 27, 1936, which application is assigned to the same assignee as this invention.

While I have disclosed particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A temperature control device for a heated medium comprising a thermostat having a substantially fixed portion arranged to be placed in direct thermal relation with said medium and a second portion relatively removed from direct thermal relation with said medium and free to move in response to changes in temperature of said thermostat, the heat imparted to said first portion by its direct contact with said medium flowing through it and into said second portion to heat said thermostat throughout its length from its normal or room temperature to a saturated temperature condition, the temperature of said thermostat thereafter fluctuating with changes in temperature of said heated medium and said second portion taking a position corresponding to the temperature of said medium, a control member for the heating means of said medium operated by said second portion to apply heat to and cut heat from said medium in a series of on and off heat cycles, and means reducing the movement of said second portion in the direction of heat cut-off when said thermostat is in the cooling portion of said first heat cycle after the initial application of heat to said medium has been cut off and while said thermostat is attaining its saturated temperature condition from end to end to cause premature application of heat to said medium in said second cycle so as to elevate materially the maximum cut-off temperature of said second heat cycle.

2. In electrically heated apparatus having a heated body and a heating element therefor, a temperature control device for said apparatus comprising a bimetallic thermostat bar having one end portion secured to said body in direct thermal relation with it and its other end portion lying substantially in the plane of the first portion, relatively removed from direct thermal contact with said body, and free to move in opposite directions in response to temperature changes, heat in said body being imparted to the secured end portion of said bar and flowing through said bar to the other end portion until said bar attains a saturated temperature condition from end to end, and thereafter, the temperature of said bar fluctuating with changes in temperature in said body, a control element for said heating element carried by said other end portion to control said heating element to apply and shut off heat in a series of on and off heat cycles depending on the temperature condition of said bar, a part of said other end portion arranged to move in directions opposite to the remainder of said bar in response to temperature variations in said bar and having a length related to the length of said remaining portion so that said thermostat operates to cause said heating element to cut off heat in each on and off cycle, including the first, at substantially the same maximum temperature, thereby compensating for the difference in curvature of said bar in the first heat cycle due to different temperature conditions in it while the bar is attaining its saturated temperature condition.

3. In a heated apparatus having heating means, a temperature control device for said apparatus comprising a bimetallic thermostatic member controlling the heating means having a portion movable laterally in response to changes in the temperature of said thermostatic member, a control element operated by said movable portion to cause said heating means to cut off and reapply heat to said apparatus in a series of heat cycles depending upon the temperature of said thermostatic member, said thermostatic member being thermally related to said apparatus so that heat is imparted to one portion of said member relatively removed from said movable portion and flows through said one portion to said movable portion to heat said thermostatic member throughout from end to end from its normal or room temperature to a substantially saturated temperature condition throughout, the temperature of said thermostatic member thereafter fluctuating with changes in the temperature in said apparatus, a part of the movable portion of said thermostatic member which is relatively removed from that portion to which heat is applied being relatively uninfluenced by temperature increase in said apparatus during the heating portion of the initial heat cycle and said part of said movable portion also being reversely arranged to the remaining part thereof that is adjacent to that portion of the thermostatic member to which heat is applied so as to decrease the movement of said thermostatic member in the direction of heat cut-off while said member is attaining a saturated temperature condition during the cooling portion of said first heat cycle thereby to substantially compensate for the variation in the motion of said thermostatic member as between the initial and the succeeding heat cycles.

4. In an electrically heated flatiron having a sole plate and an electrical heating element for said sole plate, a temperature control device for said flatiron comprising a bimetallic thermostat bar having one end portion clamped to said sole plate in good thermal relation with it and the remainder of said bar including its other end portion out of contact with said sole plate and lying substantially in the plane of said clamped end portion and free to curve in opposite directions relative to said sole plate in response to heating and cooling of said bar, a switch element carried by the free movable end portion of said bar to cause said heating element to apply and cut off heat in a series of on and off heat cycles depending upon the temperature condition of said bar, the temperature of said bar being elevated from room or normal temperature by heat imparted to the fixed end portion of said bar by its direct thermal contact with said sole plate, the heat flowing from said fixed end portion to said movable end portion until a saturated temperature condition exists in said bar from end to end, and the temperature of said bar thereafter fluctuating with fluctuations in the temperature of said sole plate, a predetermined length of the portion of said bar adjacent said free end being arranged to curve in directions reversed to that of the rest of said bar when the temperature in said bar changes due to changes of temperature in said sole plate, said predetermined length being proportioned to the length the rest of said bar so that the effective curvature of said blade is such that it will operate said switch to cut off the heat to said sole plate at substantially the same maximum temperature of said plate in each heating cycle, thereby compensating for differences in curvature of said bar due to the different temperature conditions in it while the bar is attaining a saturated temperature condition.

RUSSELL A. WINBORNE.

CERTIFICATE OF CORRECTION.

Patent No. 2,128,869. August 30, 1938.

RUSSELL A. WINBORNE.

It is hereby certified that error appears in the printed specification of the above numbered patent requiring correction as follows: Page 3, second column, line 51, for "simple" read simply; page 5, second column, line 28, claim 4, after the word "length" insert of; and that the said Letters Patent should be read with this correction therein that the same may conform to the record of the case in the Patent Office.

Signed and sealed this 11th day of October, A. D. 1938.

Henry Van Arsdale (Seal)

Acting Commissioner of Patents.